Dec. 15, 1936.  H. E. BRELSFORD  2,064,148
GAUGE GLASS
Filed June 20, 1932  2 Sheets-Sheet 1

Inventor
Harry E. Brelsford
By Whittemore Hulbert Whittemore & Belknap
Attorneys Dec. 15, 1936.   H. E. BRELSFORD   2,064,148
GAUGE GLASS
Filed June 20, 1932   2 Sheets-Sheet 2

Inventor
Harry E. Brelsford
Whittemore Hulbert
Whittemore & Belknap
Attorneys

Patented Dec. 15, 1936

2,064,148

UNITED STATES PATENT OFFICE 2,064,148

GAUGE GLASS

Harry E. Brelsford, Birmingham, Mich., assignor to Diamond Power Specialty Corporation, Detroit, Mich., a corporation of Michigan Application June 20, 1932, Serial No. 618,366

11 Claims. (Cl. 73—54)

This invention relates to a gauge adapted more particularly for use in indicating or determining the level of a fluid or the like.

One of the primary objects of this invention is to provide a gauge of the above mentioned character which may be conveniently utilized for determining the level of a fluid which differs substantially in temperature and/or pressure from the temperature and/or pressure of the environment of the gauge.

The invention contemplates the provision of a gauge which will include a transparent member through which the level of the fluid being measured may be observed, which transparent member will be exposed to the temperature of the fluid being measured, and to provide means acting counter to this temperature and tending to maintain the transparent member at a predetermined desired temperature.

The invention further contemplates the provision of a gauge of the above mentioned character provided with means for preventing damage or injury to operators in the event that the gauge becomes broken.

Still further the invention contemplates the provision of an alarm or indicating means associated with a gauge for advising an attendant of leakage or failure of the gauge.

The invention further contemplates the provision of means for exerting a counter pressure on a transparent member through which a fluid under high pressure may be observed to thus prevent this transparent member from becoming broken by the pressure of the fluid being measured.

Still further the invention contemplates the provision of a gauge of the above mentioned character in which the transparent member will be capable of withstanding extremely high temperatures so that the gauge may be readily utilized under conditions where gauges of this character have heretofore not been practical.

The invention further contemplates the provision of means for heating or cooling a gauge of the above mentioned character, whenever this becomes desirable to obtain a proper indication of the level of the fluid being measured.

Numerous other objects and advantages of this invention will become more apparent as the following description proceeds, particularly when reference is had to the accompanying drawings, wherein.

Figure 1:
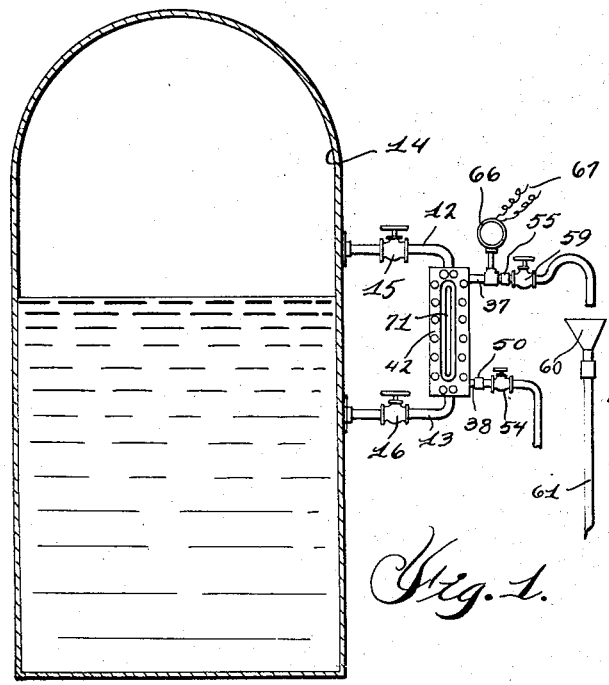
Fig. 1 is a diagrammatic view of a tank or the like containing a fluid, the level of which is to be measured, together with a gauge constructed in accordance with the teachings of this invention associated with this tank.
Figure 2:
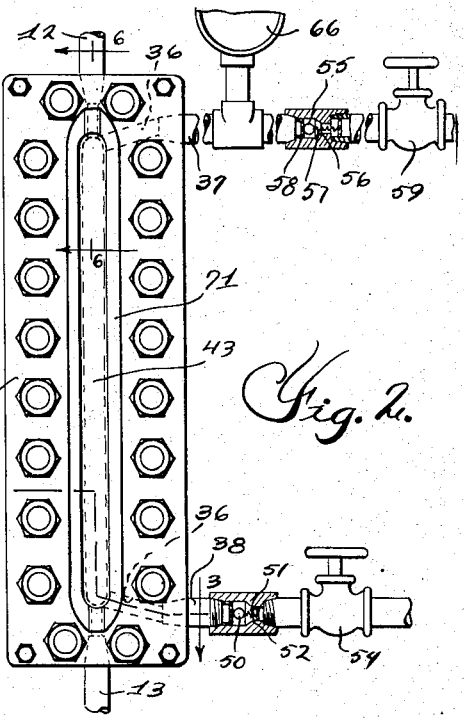
Fig. 2 is an elevational view partly in section of the gauge shown in Fig. 1.

Referring then particularly to the drawings wherein like reference characters designate corresponding parts throughout all views, the numeral 10 designates a flat gauge body having an internal longitudinally extending opening or cavity 11 for the reception of the fluid to be measured. Conduits 12 and 13 are connected to the upper and lower ends respectively of the cavity 11, and these conduits are in communication with the interior of the tank or container 14 above and below the level of the fluid therein. Valves 15 and 16 are mounted in the conduits 12 and 13, respectively, to provide for closing communication between the interior of the tank and the gauge.

It is to be understood that the tank 14 may constitute any container adapted to receive a quantity of a fluid. This tank may be a boiler drum or the like or may be a tank such, for example, as is used in the hydrogenation of crude oil and the like.

The body 10 is provided on its opposite side faces with recesses 20 providing seats for receiving projections 21 on intermediate cover members 22. The body portion is also provided on each side face with projections 23 arranged to engage in recesses 24 in the adjacent faces of the intermediate covers 22 to prevent relative sidewise movement between the body 10 and these intermediate covers. Since the intermediate covers are of like construction, one only will be described in detail, it being understood that the complete gauge is symmetrical on opposite sides of a center line passing through the gauge body or holder 10.

Each projection 21 surrounds a transparent member 25 which is arranged in a recess 26 formed in the cover 22. This recess may, if desired, be provided at longitudinally spaced points with shoulders 27 forming seats for the transparent member or sight glass. Thus it will be apparent that the transparent member is spaced for part of its length from the surfaces 28 of the recess, there being preferably, however, a bead 29 which borders the recess adjacent the outer free edge thereof and engages the sight glass adjacent its outer free edge.

It will be noted that the cavity 11 in the body 10 opens through the sides of the body and thus through the floors of the seats 20. For closing or sealing this cavity there is provided a transparent strip 30 preferably of mica which fills the seat and is disposed between the projection 21 and the body 10. Gaskets 31 of asbestos or the like are preferably positioned between the mica strip and the body 10, these gaskets extending the full length of the seat 20 but being of such a width that they do not extend over the sight glass 25.

Figure 3:
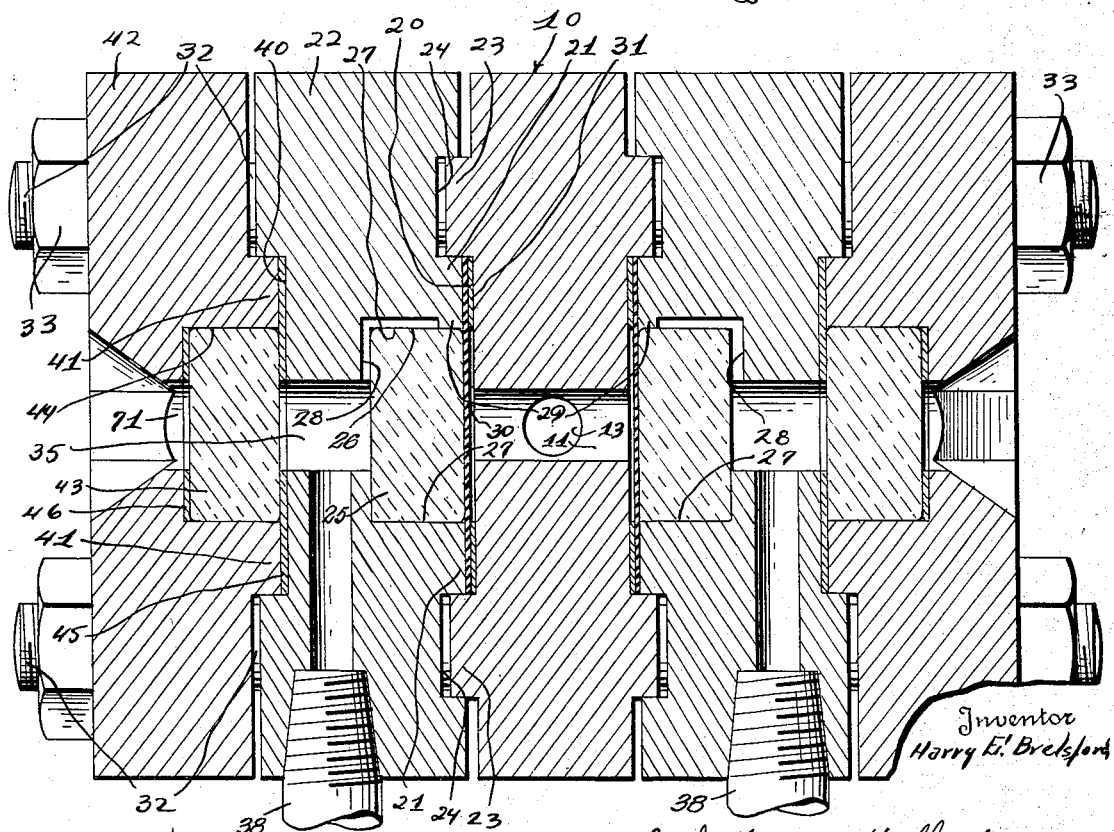
Fig. 3 is a sectional view taken substantially on the line 3—3 of Fig. 2.
Figure 6:
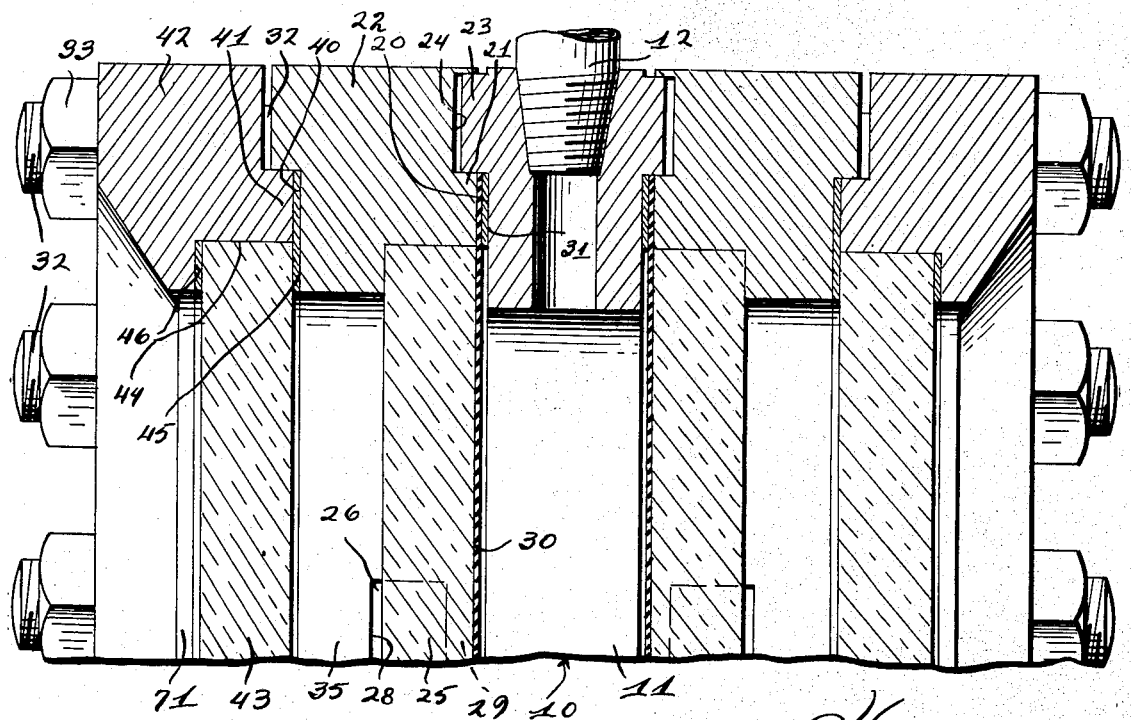
Fig. 6 is a sectional view taken substantially on the line 6—6 of Fig. 2.
Figure 4:
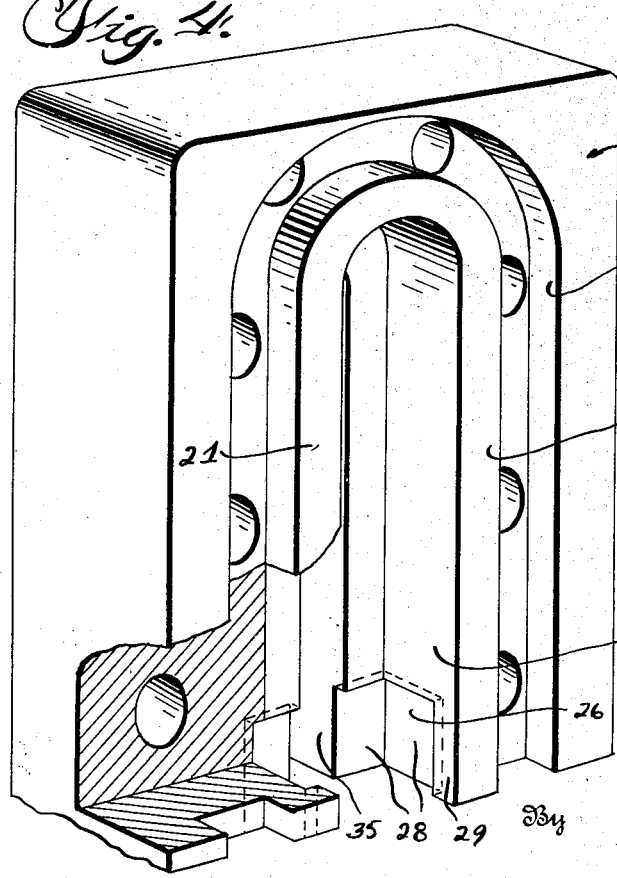
Fig. 4 is a fragmentary perspective view of a portion of the gauge.
Figure 5:
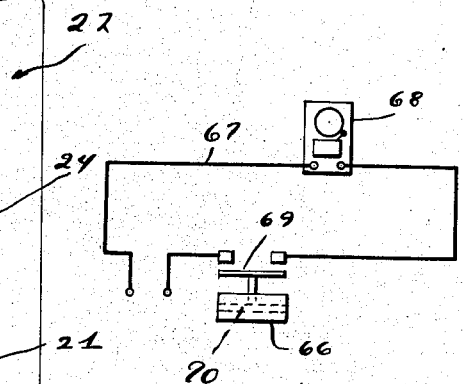
Fig. 5 is a diagrammatic view showing the manner in which an alarm may be electrically associated with a gauge constructed in accordance with the teachings of the invention.

The sight glass is preferably of slightly less thickness than the depth of the recess 26, with the result that the projection 21 acts directly on the mica strip, and urging this strip against the gaskets 31, seals the cavity 11 in the body 10. The pressure of the fluid in the cavity 11 is exerted on the mica strip, and this strip is backed up and thus prevented from breaking by the transparent member or sight glass 25. It will be apparent, however, that the clamping action is between the projection 21 and the body 10 so that the transparent member is free to expand and contract except for the strain imposed upon it by friction of the mica strip against the face of this transparent member. For the purpose of effecting this clamping action between the projection and the body 10, bolts 32 extend through the several covers and body of the gauge, these bolts being engaged by suitable clamping nuts 33, as clearly illustrated in Fig. 3 of the drawings.

Each intermediate cover 22 is provided with a longitudinally extending cavity 35. This cavity does not, however, extend the full length of the member 22, there being provided laterally extending bores 36 at the ends of the cavity into which conduits 37 and 38 are tapped at the upper and lower ends of the cavity respectively. A separate pair of conduits, 37 and 38, is provided for the cavity 35 of each intermediate cover 22 on opposite sides of the gauge body 10.

The cavity 35 opens at its one side into the recess 26 so that fluid admitted to the cavity may flow into this recess between shoulders 27 and thus partially around the sight glass disposed in this recess. This fluid will, however, be prevented from passing into cavity 11 in body 10 by virtue of the mica strip 30 sealing this latter cavity.

Each intermediate member 22 is provided on its side opposite the side in which the recess 26 is located, with a recess or seat 40 adapted to receive a projection 41 on an outer cover member 42. The projection 41 of this cover member surrounds a transparent member or sight glass 43 which is disposed in a recess 44 formed in the cover member. If desired, the transparent member 43 might be mounted loosely in the same manner as the transparent member 25, but since this latter member will not in general be subjected to pressures and temperatures as great as the member 25, it may be clamped in position by providing gaskets 45 and 46 of asbestos or the like, these gaskets being disposed between the projection 41 and the transparent member 43 and the seat 40 and between the other face of the glass and the base of the recess 44. Thus when the nuts 33 are tightened on the clamping bolts the glass 43 will be clamped in position to effectively seal the outer side of the cavity 35.

Located in the conduit 38 is a check valve 50 arranged to permit the flow of a fluid into the cavity 35 of the associated intermediate cover 22, but designed to close in the event that the pressure in the cavity reaches a predetermined degree. A spring 51 preferably holds the check valve 50 away from its seat 52, the valve at this time being held against a cage or the like formed in the conduit. The conduit is also proferably provided with a manually controlled valve 54 by which the flow of fluid into the cavity may be regulated.

The conduit 37 is provided with a check valve 55 arranged to engage a seat 56 and normally held away from this seat by a spring 57 whereby fluid under a predetermined low pressure may flow from the cavity 35 by way of conduit 37. A cage or the like 58 is provided for receiving the ball check valve when the latter is in open position, and the conduit 37 may, as illustrated, be provided with a suitable manually controlled valve 59.

If desired, the conduit 37 may be arranged to discharge into a funnel or the like 60 formed on the upper end of a discharge conduit 61 which may conduct the fluid discharged from the cavity by way of conduit 37 to any desired point. It will be apparent that if the discharge end of conduit 37 is spaced above funnel 60 the discharge from this conduit may be at all times observed.

It constitutes a feature of this invention to place a pressure gauge in communication with the chamber or cavity 35, and while this pressure gauge may be tapped into this cavity at any desired point, it is shown as being tapped into the conduit 37 in advance of the check valve 55. Thus there is provided a short pipe section which is tapped into the conduit 37 and which communicates with a pressure gauge 66 of any desired character. This pressure gauge is preferably provided with a suitable pointer or the like (not shown) by which the pressure of the fluid within the cavity 35 will be directly indicated.

There is also preferably provided an electric circuit 67 in which there is electrically connected a suitable alarm such as a bell or the like 68, and this circuit is arranged to be closed when the pressure in cavity 35 reaches a predetermined degree, this being accomplished by providing a contact member 69 connected to the plunger or pressure actuated member 70 of the gauge 66. It will be obvious that the electrical circuit 67 may be connected to the pressure gauge 66 as shown or may be directly controlled by a diaphragm or the like exposed to the pressure in cavity 35.

It will be noted that each member 42 is provided with a longitudinally extending slot 71 which opens through to the recess 44. This slot is outwardly flared to facilitate viewing the liquid in cavity 11 through windows 43 and 25.

It constitutes a feature of this invention that for use in gauges for determining the level of liquids of extremely high temperature, the sight glasses 25 and also 43 if desired, may be formed of fused silica, commonly called quartz. The critical temperature where the best obtainable glass generally rapidly loses its strength does not exceed 1000° F. In measuring such fluids as crude oil during the refining of the same by the hydrogenation process, temperatures are often in the neighborhood of 1000° F. or more with pressure in the neighborhood of 1000 lbs. per sq. in or more. Gauges which have heretofore been built have not been practical for use in indicating or determining the level of the liquid in hydrogenation apparatus because of these high temperatures and pressures. The present invention provides cooling means for use with the sight glasses and gauges for determining liquid levels under temperatures and pressures as high as these and contempates further that if the cooling means is not sufficiently efficient to effect the desired cooling of the sight glasses, these may be made of quartz which has a critical temperature in the neighborhood of 1900 to 2000° F.

It will be noted that the several parts of the gauge are clampingly engaged with each other only at the points where the projections 41 and 21 engage in their respective seats. Thus the several cavities or openings in the gauge parts may be effectively sealed upon tightening of the nuts 33 on the clamping bolts 32.

In use, the gauge may be connected to a tank or the like in the manner illustrated in Fig. 1 of the drawings. The fluid or liquid the level of which is to be determined will enter cavity 11 by way of conduit 13, the pressure in this cavity being uniform throughout by virtue of its connection to the tank above the level of the liquid by way of conduit 12. The level of the liquid or fluid in cavity 11 may be observed from either side of the gauge through the slots 71 and windows 25 and 43.

It is evident that a hydrocarbon fluid under a temperature such, for example, as 1000° F. and a pressure such, for example, as 1000 lbs. per sq. in. would immediately burst into flame upon contact with the atmosphere containing oxygen. The present construction will therefore find particular utility when utilized in a device for measuring such fluids at these temperatures and pressures, for should the fluid leak from the cavity 11 past either of the sight glasses 25, it will be trapped in one of the cavities 35 and thus be prevented from being discharged into the atmosphere. Thus the invention provides a means for preventing the contact of the fluid being measured with the atmosphere in the event of failure of the sight glass adjacent the liquid being measured or in the event of leakage around this sight glass.

In use, the valves 54 and 59 may be left open, thus placing the cavities 35 in communication with the atmosphere. Obviously, should leakage occur from the cavity 11 into either of the cavities 35, the pressure in these latter cavities would immediately be raised a substantial amount, which raise would be indicated by the gauge 66, thus calling the attention of the attendant to the fact that leakage was occurring from the primary gauge body. It is obvious that upon the building up of pressure in the cavities 35, the check valves in the conduits 37 and 38 would be closed, thus preventing discharge of the leaking fluid to the atmosphere and allowing a closing of the valves 15 and 16 to disconnect the entire gauge from the tank with which it is normally connected. The bell 68 may be electrically connected to the pressure gauge or otherwise made responsive to the pressure of the fluid in cavities 35 to thus audibly advise the attendant of the leakage from the cavity 11.

As brought out before, the invention will find particular utility where fluids are to be measured having temperatures differing substantially from that of the environment of the gauge or from that at which it is desired to maintain the sight glass. Thus the fluid may be extremely cold or extremely hot, in either of which cases the sight glasses 25 will be exposed to these temperatures. The chambers or cavities 35 may in this event be supplied with a cooling or heating fluid to thus act counter to the temperature of the fluid to be measured and tend to maintain the sight glasses 25 at a desired or suitable temperature.

Thus if, for example, a fluid at an extremely high temperature is being measured, a cooling fluid may be introduced into each chamber 35 by virtue of its respective inlet 38, this conduit in this instance being suitably connected to a source of cooling fluid (not shown). The cooling fluid will fill the cavities 35 and flow around three sides of the respective sight glasses 25 by virtue of the shoulders 27 which space the side and outer walls of these glasses from the walls 28. Thus while one face of each sight glass will be exposed to the high temperature in chamber 11, the sight glass will be maintained relatively cool by the circulation of the cooling fluid through the chambers 35. As previously described, if leakage should occur, pressure would immediately build up in one of the chambers 35 with the result that the check valves in conduits 37 and 38 would be closed, and this building up of pressure would be indicated either by the pressure gauge or by the audible signal.

In measuring certain types of substances, it frequently becomes desirable to modify the temperature of the gauge in order that an accurate measurement may be obtained. Thus, for example, compounds such as diphenyl have a melting point considerably above a normal temperature, so that it is generally impossible to measure the level of such a substance in a gauge spaced a substantial distance from the tank which contains the substance. By virtue of the present construction a heating medium may be admitted to the chambers 35 to thus raise the temperature of the adjacent gauge parts and to thus maintain the compound being measured in a liquid state whereby an accurate measurement may be obtained.

Where the fluid being measured is under high pressure it is apparent that the sight glasses 25 are exposed to this pressure inasmuch as they back up the mica strips 30. In this event it is possible with the construction disclosed to admit a pressure fluid to each of the recesses or cavities 35, this pressure fluid acting on the rear face of each of the sight glasses 25 to thus relieve the same from the strain of the pressure exerted on the face of the sight glass by the fluid in cavity 11. In this instance the check valves in the lines 37 and 38 may or may not be used, if used, these valves being held open by their respective springs. It will be apparent that by regulating the supply of pressure fluid a graded pressure may be exerted on the outer face of each sight glass to act counter to the pressure exerted on the inner face of each sight glass.

Still further, by virtue of the mounting of the several sight glasses, these members may be formed of fused silica so that they may withstand the highest temperatures which will be encountered in general work. The construction forming the subject matter of this application permits the use of sight glasses formed of fused silica since it provides for the sealing of the cavity 11 without exerting a clamping pressure on the sight glasses 25. Thus the transparent members 25 are loosely mounted, being exposed only to the frictional tension exerted on the same by the mica strips 30. The forming of the transparent members of fused silica will be particularly desirable where the pressures and temperatures are extremely high and the transparent members must therefore be substantially thick, with the result that a complete cooling of the same may not be effected by a cooling medium in chambers 35.

In instances where the gauge is utilized for measuring fluids at extremely high pressures and extremely high or low temperatures, the pressure fluid supplied to chambers 35 may also be a cooling or heating fluid. Thus the fluid may function not only to exert a counter pressure on the transparent member, but also function to cool or warm the same. If desired, the pressure gauge and audible signal may be eliminated, the attendant in this event observing the discharge from conduit 37 into funnel 60 to determine whether or not there is any leakage from the cavity 11. Obviously, if no cooling fluid is supplied to cavities 35, this leakage will be immediately apparent, while if a cooling fluid is supplied to cavities 35, the leakage may be observed if the fluid being measured differs in appearance from the cooling fluid. When the gauge is used in this manner the check valves might, if desired, be removed and the valves 54 and 59 adjusted to nearly closed positions in order that discharge from cavities 35 will be restricted, thus eliminating danger to the boiler attendants in the event that leakage occurs.

From the above it will be apparent that the invention provides a gauge which may be utilized in measuring the level of fluids at extremely high pressure and also at temperatures differing substantially from a desired temperature. The gauge is so constructed that failure of the transparent member adjacent the cavity which receives the fluid to be measured will not allow a discharge of this fluid into the atmosphere. Further, an attendant will immediately be notified as to the leakage of the fluid being measured so that the gauge as a unit may be immediately disconnected from the source of fluid being measured. The invention provides for cooling or otherwise modifying the temperature of the sight glasses, provides for modifying the temperature of the substance being measured, and provides for the exertion of pressures on these glasses counter to the pressures to which they are subjected by the fluid being measured.

While the invention has been described with some detail, it is to be understod that the description is for the purposes of illustration only and is not definitive of the limits of the inventive idea. The right is reserved to make such changes in the details of construction and arrangement of parts as will fall within the purview of the attached claims.

What I claim as my invention is:

1. In a gauge of the class described, a gauge body having a cavity opening through one side thereof for receiving the fluid to be measured, means for sealing the open side of said cavity, means providing a chamber for trapping any fluid escaping from said cavity past said sealing means, and pressure responsive means for indicating the presence of escaping fluid in said chamber.

2. In a gauge of the class described, a gauge body having a cavity opening through one side thereof for receiving the fluid to be measured, means for sealing the open side of said cavity, means providing a chamber for trapping fluid escaping from said cavity past said sealing means, a signal, and means responsive to the pressure in said chamber for actuating said signal.

3. In a gauge for measuring the level of a fluid the pressure of which differs substantially from atmospheric pressure, a gauge body having a cavity for receiving the fluid to be measured, a transparent member through which the level of the fluid in the cavity may be observed, said member being exposed on its one side to the pressure of the fluid in the cavity, and means for exerting a graded regulable pressure on said transparent member acting counter to the pressure exerted on said member by the fluid to be measured to prevent overstraining of said transparent member.

4. The combination with a gauge for measuring a high temperature and high pressure fluid, and a window member having one face exposed to the high temperature and high pressure of the fluid being measured, of means providing a chamber around the remaining faces of said window member, and means for supplying a cooling fluid under a graded regulable pressure to said chamber.

5. In a gauge of the class described, a gauge body having a cavity for receiving a fluid to be measured, said body being provided with a projection on each side of the cavity extending parallel to and substantially coextensive with the cavity, a cover associated with the body and provided with a recess to receive a sight glass, said cover being further provided with a groove on each side of the glass recess but spaced therefrom and of a size to closely receive and engage the side edges of the projections of the body, and means to clamp said body and cover together.

6. In a gauge of the class described, a gauge body having a cavity for receiving a fluid to be measured, a cover for said body having a recess for receiving a sight glass, and a projection on said gauge body snugly engageable in a recess in said cover for preventing lateral movement of said body relative to said cover, said projection and said recess being spaced from the cavity in the body and the sight glass receiving recess in the cover.

7. In a gauge of the class described, a gauge body having a cavity for receiving a fluid to be measured, a flat sight glass constituting a closure for one side of said cavity, means providing a chamber partially surrounding said sight glass, and means for supplying a fluid to said chamber to control the temperature of said sight glass.

8. In a gauge of the class described, a gauge body having a cavity for receiving high temperature fluid to be measured, a flat sight glass through which the level of the fluid in said cavity may be observed, said sight glass having its rear face disposed adjacent one side of said cavity whereby the rear face of said sight glass is subjected to the temperature of the fluid to be measured in the cavity, and means providing for the flowing of a cooling fluid into contact with the front face and side edges of said sight glass.

9. In a gauge of the class described, a gauge body having a cavity for receiving a fluid to be measured, and a cover for said body, said cover and body having snugly fitting interengaging portions arranged to prevent lateral bulging of said body with reference to said cover.

10. In a gauge of the class described, a gauge body member having a cavity for receiving a fluid to be measured, a cover member for said body member and projections formed on one of said members snugly engaging in recesses in the other of said members and arranged to prevent lateral bulging of said body member with reference to said cover member.

11. In a gauge for measuring the level of a high temperature fluid, a sight glass exposed to the temperature of the fluid being measured, means providing a chamber in heat exchange relation with respect to said sight glass, and valve controlled conduits communicating with said chamber providing for the supply of a cooling fluid to and the discharge of the cooling fluid from said chamber.

HARRY E. BRELSFORD.